US007971054B1

(12) United States Patent
Boisjolie et al.

(10) Patent No.: US 7,971,054 B1
(45) Date of Patent: Jun. 28, 2011

(54) METHOD OF AND SYSTEM FOR REAL-TIME FORM AND CONTENT CLASSIFICATION OF DATA STREAMS FOR FILTERING APPLICATIONS

(75) Inventors: Darren R. Boisjolie, Valparaiso, FL (US); John Kolen, Niceville, FL (US)

(73) Assignee: BSecure Technologies, Inc., Fort Walton Beach, FL (US)

( * ) Notice: Subject to any disclaimer, the term of this patent is extended or adjusted under 35 U.S.C. 154(b) by 952 days.

(21) Appl. No.: 11/857,246

(22) Filed: Sep. 18, 2007

Related U.S. Application Data (60) Provisional application No. 60/845,615, filed on Sep. 19, 2006.

(51) Int. Cl.
*G06F 9/00* (2006.01)
*G06F 15/16* (2006.01)
*G06F 17/00* (2006.01)
*H04L 29/06* (2006.01)

(52) U.S. Cl. .................................... 713/154; 726/11
(58) Field of Classification Search .................. 713/154; 726/11
See application file for complete search history.

(56) References Cited

U.S. PATENT DOCUMENTS

| | | | | |
|---|---|---|---|---|
| 4,794,594 A * | 12/1988 | Picard | ............................ | 370/392 |
| 5,280,480 A * | 1/1994 | Pitt et al. | ........................ | 370/256 |
| 5,309,437 A * | 5/1994 | Perlman et al. | ................ | 370/401 |
| 5,623,600 A * | 4/1997 | Ji et al. | .............................. | 726/24 |
| 5,724,027 A * | 3/1998 | Shipman et al. | ................. | 726/16 |
| 5,734,824 A * | 3/1998 | Choi | .............................. | 709/224 |
| 7,778,999 B1 * | 8/2010 | Boisjolie et al. | .............. | 707/722 |
| 2006/0184998 A1 | 8/2006 | Smith et al. | | |
| 2006/0236095 A1 | 10/2006 | Smith et al. | | |
| 2007/0199066 A1 | 8/2007 | Smith et al. | | |

* cited by examiner

*Primary Examiner* — Kambiz Zand
*Assistant Examiner* — Benjamin A Kaplan
(74) *Attorney, Agent, or Firm* — Winstead PC (57) ABSTRACT

A digital-content-analysis system includes a network services component adapted to receive a remote service request, a stream monitor adapted to form digital content into at least one data stream, and a stream analyzer interoperably coupled to the network services component and the stream monitor and adapted to receive and analyze the at least one data stream. The stream analyzer includes a lexical analyzer adapted to separate the at least one data stream into a plurality of tokens, a classifier adapted to classify the at least one data stream into at least one category by processing at least a subset of the plurality of tokens and computing a classification rating for at least one category, and a set of parameters. At least a subset of the parameters contains information developed from previous operation of the stream analyzer.

21 Claims, 9 Drawing Sheets

METHOD OF AND SYSTEM FOR REAL-TIME FORM AND CONTENT CLASSIFICATION OF DATA STREAMS FOR FILTERING APPLICATIONS

CROSS-REFERENCE TO RELATED APPLICATIONS

This application claims priority to, and incorporates by reference the entire disclosure of, U.S. Provisional Patent Application No. 60/845,615, filed Sep. 19, 2006.

BACKGROUND

1. Technical Field

This patent application relates generally to form and content classification of data streams and, more particularly, but not by way of limitation, to a method of and system for real-time form and content classification of data streams for filtering applications.

2. History of Related Art

The advent of the Internet has enabled individuals to search for and obtain information faster and in greater quantities than ever before. However, while much of the information thus obtained is useful and beneficial, harmful or dangerous information may also be obtained. Because of the ease with which such information can now be obtained, improved systems for identifying such information and filtering it are needed.

SUMMARY OF THE INVENTION

A digital-content-analysis system includes a network services component adapted to receive a remote service request, a stream monitor adapted to form digital content into at least one data stream, and a stream analyzer interoperably coupled to the network services component and the stream monitor and adapted to receive and analyze the at least one data stream. The stream analyzer includes a lexical analyzer adapted to separate the at least one data stream into a plurality of tokens, a classifier adapted to classify the at least one data stream into at least one category by processing at least a subset of the plurality of tokens and computing a classification rating for at least one category, and a set of parameters. At least a subset of the parameters contains information developed from previous operation of the stream analyzer.

A system for providing distributed analysis and classification of digital content over a network includes a plurality of devices interconnected over the network. At least one of the plurality of devices being a stream analysis server. Each of the plurality of devices includes a network services component adapted to send a remote service request to another digital content analysis system or receiving a remote service request from another digital content analysis system, a stream monitor adapted to form digital content into at least one data stream, and a stream analyzer adapted to receive and analyze the at least one data stream. The stream analyzer includes a lexical analyzer adapted to separate the at least one data stream into a plurality of tokens, a classifier adapted to classify the at least one data stream into the at least one category by processing at least a subset of the plurality of tokens and computing a classification rating for at least one category, and a set of parameters. At least a subset of the parameters contains information developed from previous operation of the stream analyzer. The system also includes a site manager adapted to request classification from the stream analysis server of digital content discovered while crawling the network.

A digital-content-analysis method includes receiving a remote service request, forming digital content into at least one data stream, and receiving the at least one data stream, and analyzing the received at least one data stream. The step of analyzing includes separating the at least one data stream into a plurality of tokens and classifying the at least one data stream into at least one category by processing at least a subset of the plurality of tokens and computing a classification rating for at least one category.

DETAILED DESCRIPTION OF ILLUSTRATIVE EMBODIMENTS

Various embodiment(s) of the invention will now be described with reference to the accompanying Drawings. The invention may, however, be embodied in many different forms and should not be construed as limited to the embodiment(s) set forth herein. The invention should only be considered limited by the claims as they now exist and the equivalents thereof.

While the term network is often associated with a collection of end-user computer stations, so-called smart phones and other increasingly sophisticated tools that permit connectivity with other devices force a much broader definition. A network may be simply defined as an interconnected collection of devices. Particularly when the network is the Internet, the devices may, for example, be various combinations of computers, peripherals, terminals, network switches, network routers, personal digital assistants (PDAs), cellular phones, and the like.

A digital content filter intercepts data en route from a source to a destination. If the data meets predefined criteria or successfully passes through a predefined procedure, the data is permitted to proceed to its destination. Typically, the data is destined for viewing and perusal by an end user. A network, in addition to being a source of digital content, may also be a valuable resource for the digital content filter, or another application, in managing and analyzing the digital content. A distributed system for analyzing data from a data source may be beneficial to a data-filtering process.

Figure 1:
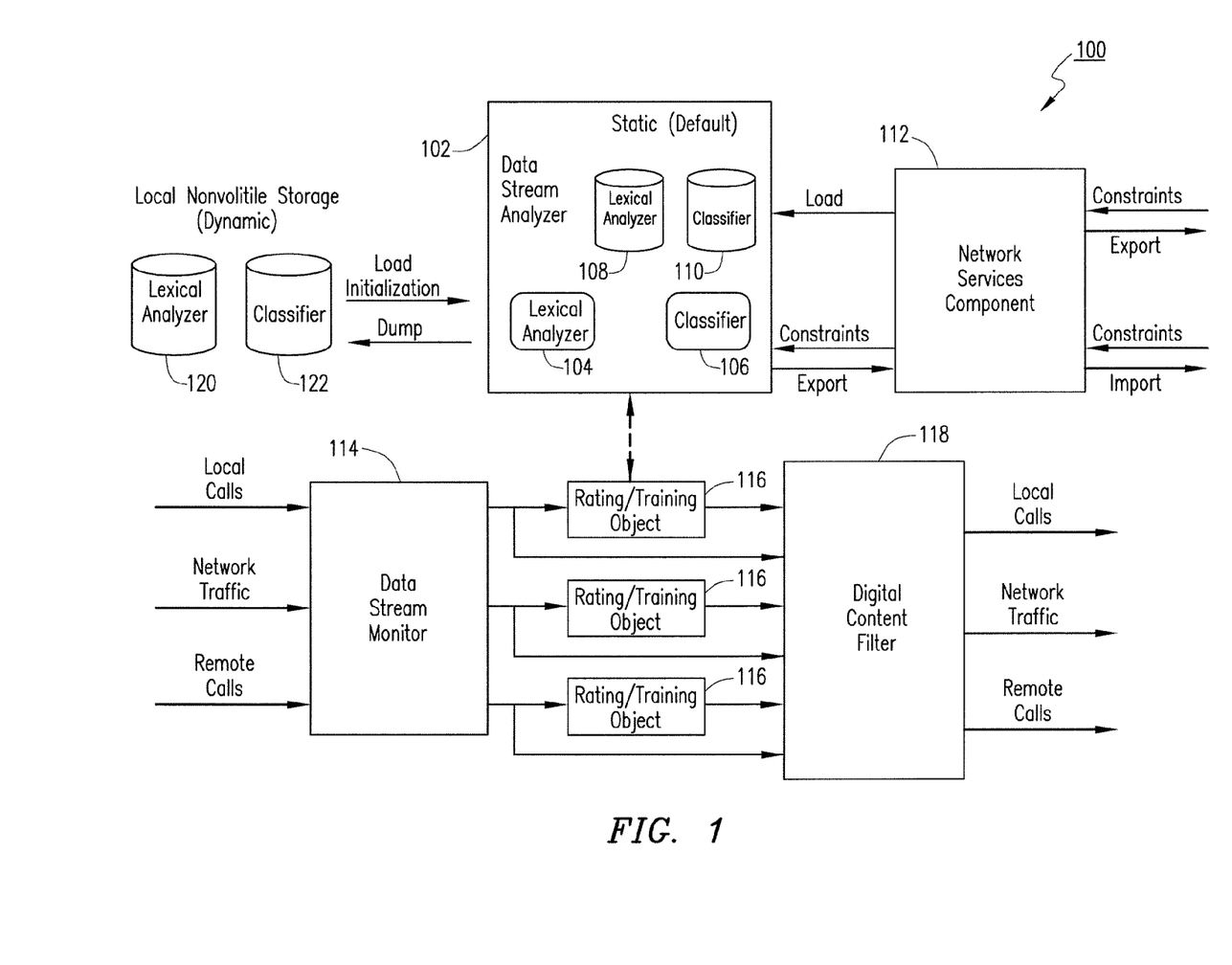
FIG. 1 is a digital-content-analysis system.

FIG. 1 illustrates a digital-content-analysis system 100. The digital-content-analysis system 100 computes one or more category-specific ratings for digital content by classifying the digital content into one or more categories. In various embodiments, the categories are non-mutually exclusive, thereby allowing the digital content to be classified into more than one category. In other embodiments, the categories may be mutually exclusive. Some illustrative categories that could be utilized in various embodiments of the invention are: SPAM, PORN, SHOPPING, VIRUS, and HTML. To illustrate the potentially non-mutually exclusive nature of the categories, one of ordinary skill in the art will note that, while PORN and SHOPPING are content-based categories, HTML is a form-based category. Therefore, for example, an internet page written in HTML and containing pornographic material may earn a rating highly indicative of the PORN category and a rating highly indicative of the HTML category.

The digital-content-analysis system 100 includes a data stream analyzer 102, a network services component 112, a data stream monitor 114, and a digital content filter 118. Usually corresponding to categories defined in the data stream analyzer 102, the digital content filter 118 may function as a filter, for example, of: spam, objectionable or offensive content such as pornographic material, or viruses. Regardless of specific categories, the digital content filter 118 relies on the data stream monitor 114 and the data stream analyzer 102 to obtain information regarding whether digital content falls within a specific category. Based on the obtained information, the digital content filter 118 may make a decision to filter or not to filter the digital content.

The data stream monitor 114 serves as an interface into the digital-content-analysis system 100 and operates to transform data from a data source into a data stream. The data may be sequential or non-sequential. The data stream monitor 114 may monitor network traffic, be called locally within the device, or, as will be described in more detail later, be remotely called from another device. In various embodiments, the data source may, for example, be a file, an e-mail message, an internet document, instant messenger traffic, or any other data source. As an example of a local call, the digital content filter 118 may call the data stream monitor 114 for classification of digital content intercepted by the digital content filter 118. With regard to monitoring network traffic, the data stream monitor 114 may passively observe network traffic or may take an active approach by intercepting selected network traffic and transforming the selected network traffic into a data stream for classification.

Once a data stream has been formed by the data stream monitor 114, the formed data stream is passed to the data stream analyzer 102. The data stream analyzer 102 includes a lexical analyzer 104 and a classifier 106. Default settings for the lexical analyzer 104 and the classifier 106 are typically provided in static storage areas 108 and 110, respectively. Settings for the lexical analyzer 104 and the classifier 106 may be updated or refined over time, for example, by using a supervised learning process and storing the updated or refined settings in dynamic storage areas 120 and 122, respectively. In various embodiments, the dynamic storage areas 120 and 122 are nonvolatile memory areas available within a device implementing the digital-content-analysis system 100. The settings for the lexical analyzer 104 and the classifier 106 are collectively referred to herein as parameters. The parameters may include, for example, a set of categories, token lists, a dictionary of key words and other identifiable units, and accumulated token ratings for the categories.

A rating object 116 is created for each data stream formed by the data stream monitor 114. When, for example, many rating objects are created, the digital-content-analysis system 100 may process a plurality of data streams in parallel. The data stream analyzer 102 utilizes the rating object 116 to store state information from an analysis and classification process occurring within the data stream analyzer 102, and ultimately, a rating for the data stream. The rating of the data stream indicates the extent to which the data stream belongs in a given category. The rating is accessible to a calling entity, in this case the digital content filter 118, via the rating object 116. Details regarding operation of the data stream analyzer 102 and the supervised learning process will be described further below.

The network services component 112 enables the digital-content-analysis system 100 to interact with other digital-content-analysis systems. To facilitate inter-system interaction, the digital-content-analysis system 100 utilizes constraints. In order to allow the digital-content-analysis system 100 to be used across diverse platforms, the constraints may account for hardware limitations of the implementing device such as memory and processing speed. For example, a cellular phone would most likely have less memory available for a digital-content-analysis system 100 than would a PC-based end-user computer station. In such a case, a constraint may be developed that corresponds to specific memory limitations of the cellular phone. Other types of constraints are also contemplated and will be apparent to one of ordinary skill in the art.

By utilizing constraints, the cellular phone and the end-user computer station would be able to communicate and share data despite a disparity in resources. In various embodiments, the network services component 112 serves as a focal point for inbound and outbound network service requests. If the network service request is inbound, a set of constraints, if necessary, will be coupled with the request. Likewise, if the network services request is outbound, constraints will be developed and sent along with the request. In various embodiments, the network service requests may be requests for parameters or requests for classification of data.

Figure 2:
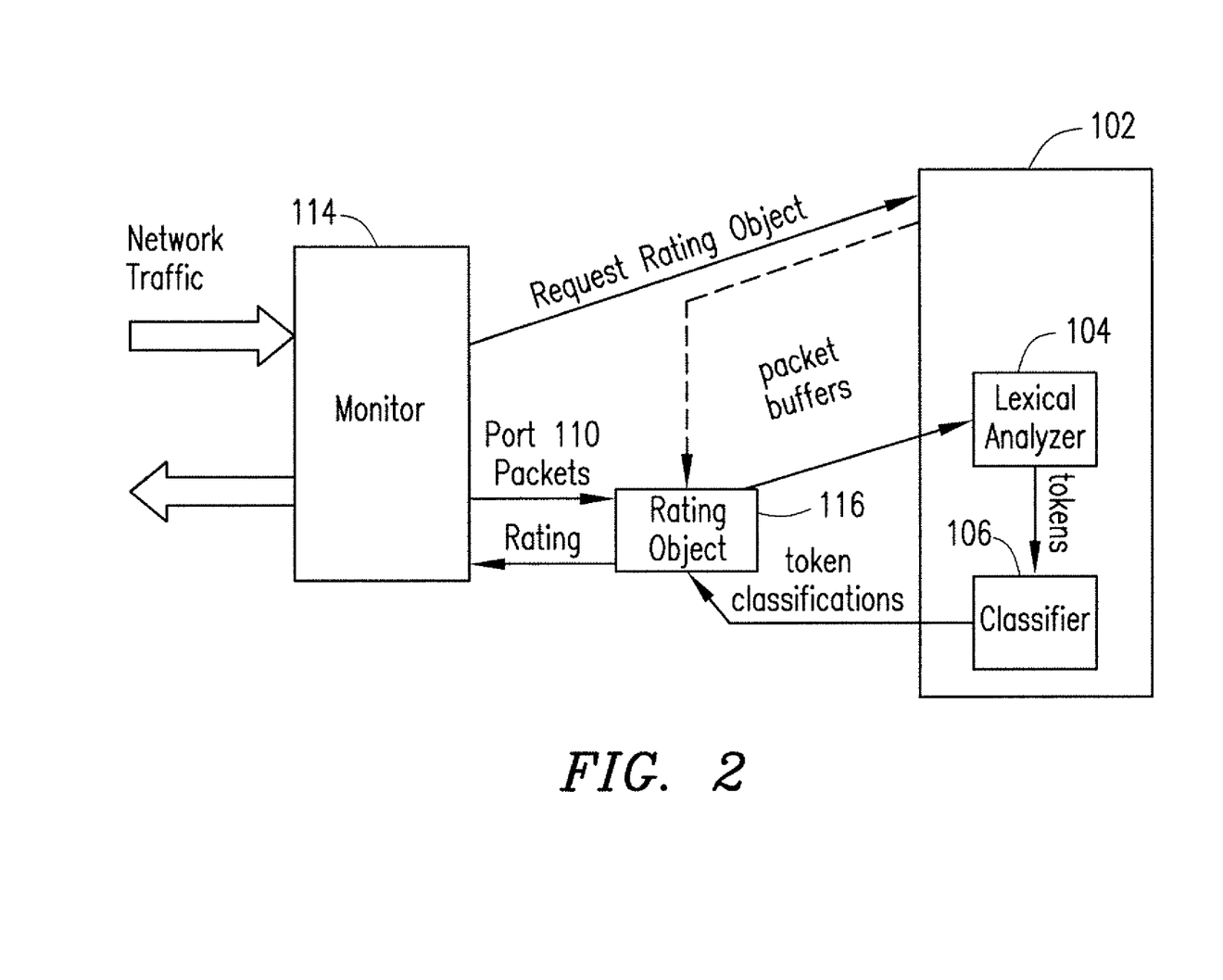
FIG. 2 illustrates interactions between a data stream monitor and components of a data stream analyzer.

FIG. 2 illustrates interactions between the data stream monitor 114 and components of the data stream analyzer 102. When the data stream monitor 114 receives a request to classify data into a specific category, a request for a rating object 116 is sent to the data stream analyzer 102. The request includes at least the data to be classified and at least one category of interest for the data. An existing rating object 116, or a dynamically created rating object 116, is provided to fulfill the request for the rating object 116. The data stream monitor 114 stores a data stream corresponding to the data to be classified in the rating object 116 along with the category of interest. The rating object 116 is then available to the data stream analyzer 102 for the stream analysis and classification process.

The lexical analyzer 104 reads the data stream from the rating object 116 and parses the data stream into tokens on a token-by-token basis, sending each token to the classifier 106 typically in real time as the token is created. For example, a finite state machine within the lexical analyzer 104 may be used to process the data stream character-by-character or symbol-by-symbol in order to produce each token. Each character processed is a state of the finite state machine. Although tokens may correspond to words, to so characterize all tokens would be an inaccurate simplification. A token may be any type of identifiable unit, such as, for example, a uniform resource locator (URL) or an e-mail header.

A dictionary of key words and other identifiable units is consulted by the lexical analyzer 104 to facilitate identification of tokens. When a token is identified, the lexical analyzer 104 stores information about its state in the rating object 116. An integer corresponding to the state, stored in the rating object 116 as part of the state information, identifies the token. The token is then sent to the classifier 106 for classification.

The classifier 106 determines whether a given input value falls within a specified category. In a typical embodiment of the digital-content-analysis system 100, the classifier 106 accepts each token as the token is produced by the lexical analyzer 104. Based on the category of interest within the rating object 116, the classifier 106 calculates a token rating, also referred to as a token classification, for each token, that is indicative of the extent to which the token belongs to the category of interest. The token classification is stored within the rating object 116. As token classifications are produced, a data stream rating, also referred to as a data stream classification, is cumulatively developed. In various embodiments, the token rating and the data stream ratings are decimal numbers between 0 and 1, with a '0' indicating relative certainty that a token or data stream does not belong to a category and a '1' indicating relative certainty that a token or data stream does belong to a category.

While processing more tokens may assure greater accuracy in classification, in various embodiments of the invention, the classification process may be terminated at any point for purposes of efficiency. When the classification process is terminated before completion, the data stream rating cumulatively developed to that point may be finalized and returned to a source of the request to classify the data. Those having skill in the art will appreciate that the digital-content-analysis system 100 is not restricted to a particular implementation of the classifier 106. In various embodiments, the classifier 106 may, for example, be a naïve Bayes classifier, a neural network classifier, a rule-based classifier, or a combination of these and/or other approaches. The type of classifier may also be dependent upon available resources or otherwise be implementation-specific.

Figure 3:
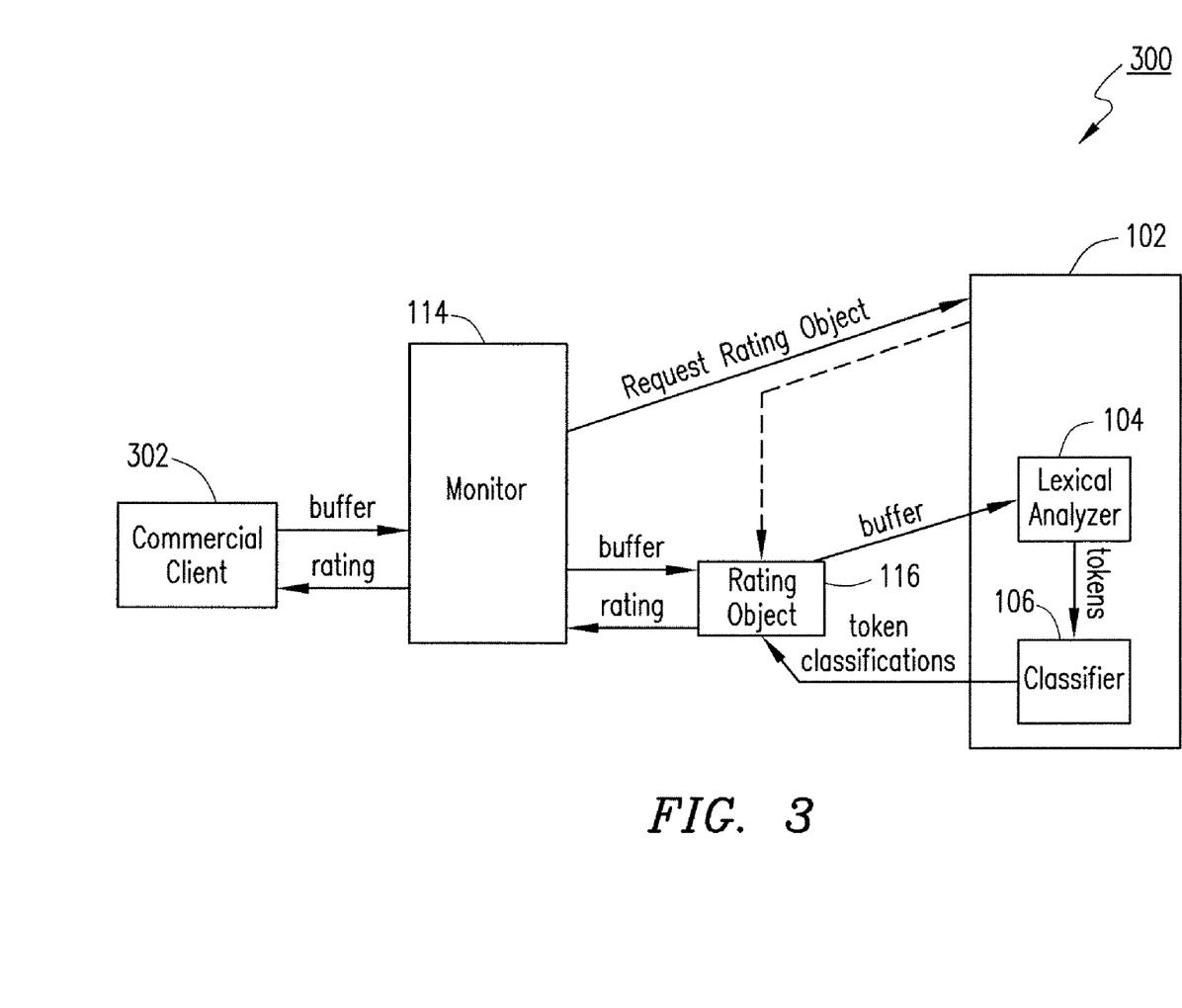
FIG. 3 illustrates a digital-content-analysis system interacting with a commercial client.

FIG. 3 illustrates a digital-content-analysis system interacting with a commercial client. In a system 300, a commercial client 302 initiates a request for classification of data into a category of interest and provides the data to the data stream monitor 114. The digital-content-analysis system 300 then processes the request and produces a rating as described with respect to FIG. 1 and FIG. 2. In various embodiments, the commercial client 302 may, for example, be a filter, web application, or any other application dependent upon classification of data.

Figure 4:
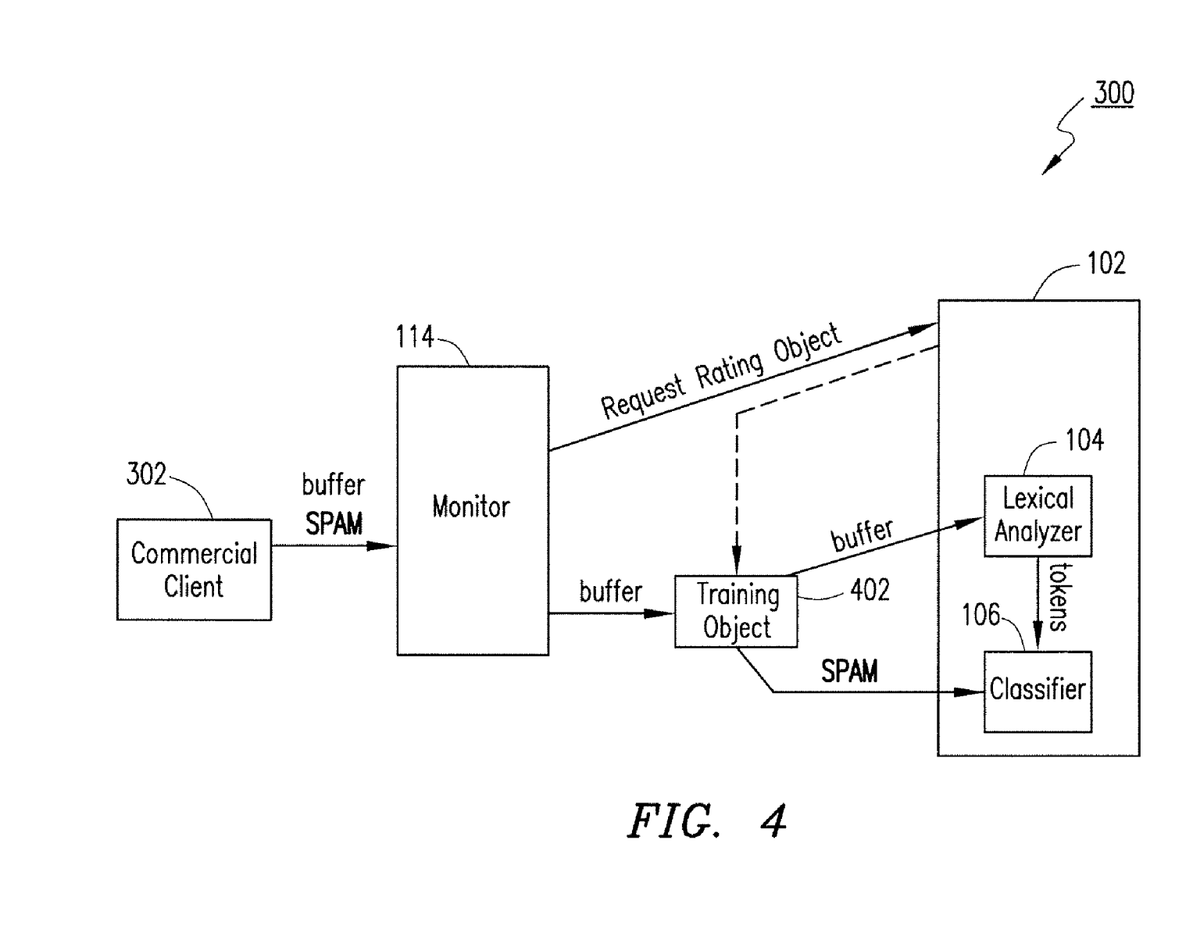
FIG. 4 illustrates a supervised training process for a digital-content-analysis system.

FIG. 4 illustrates a supervised training process for the system 300, the process being described herein by way of an exemplary embodiment in which the commercial client 302 performs spam filtering. The supervised training process begins with a user of the commercial client 302 having an e-mail message incorrectly classified into a SPAM category as a result of a rating from the classifier 116. The system 300 operates similarly to the manner described above with respect to FIG. 2, except with a predetermined conclusion that the e-mail does not belong in the SPAM category.

The e-mail message is provided to the data stream monitor 114, at which point the data stream monitor 114 requests a training object 402 from the data stream analyzer 102. A correct classification of the e-mail message and a data stream representing the e-mail message are stored within the training object 402. The training object 402 scans the e-mail message and updates the parameters, specifically updating token ratings for the category. The training object 402 then feeds the data stream representing the e-mail message to the data stream analyzer 102 in the manner described with respect to FIG. 2. If a rating indicative of the correct classification is not obtained, the training object 402 again updates the category ratings. When the rating indicative of the correct classification is obtained, the training object 402 saves the updated parameters and the supervised training process ends.

Figure 5:
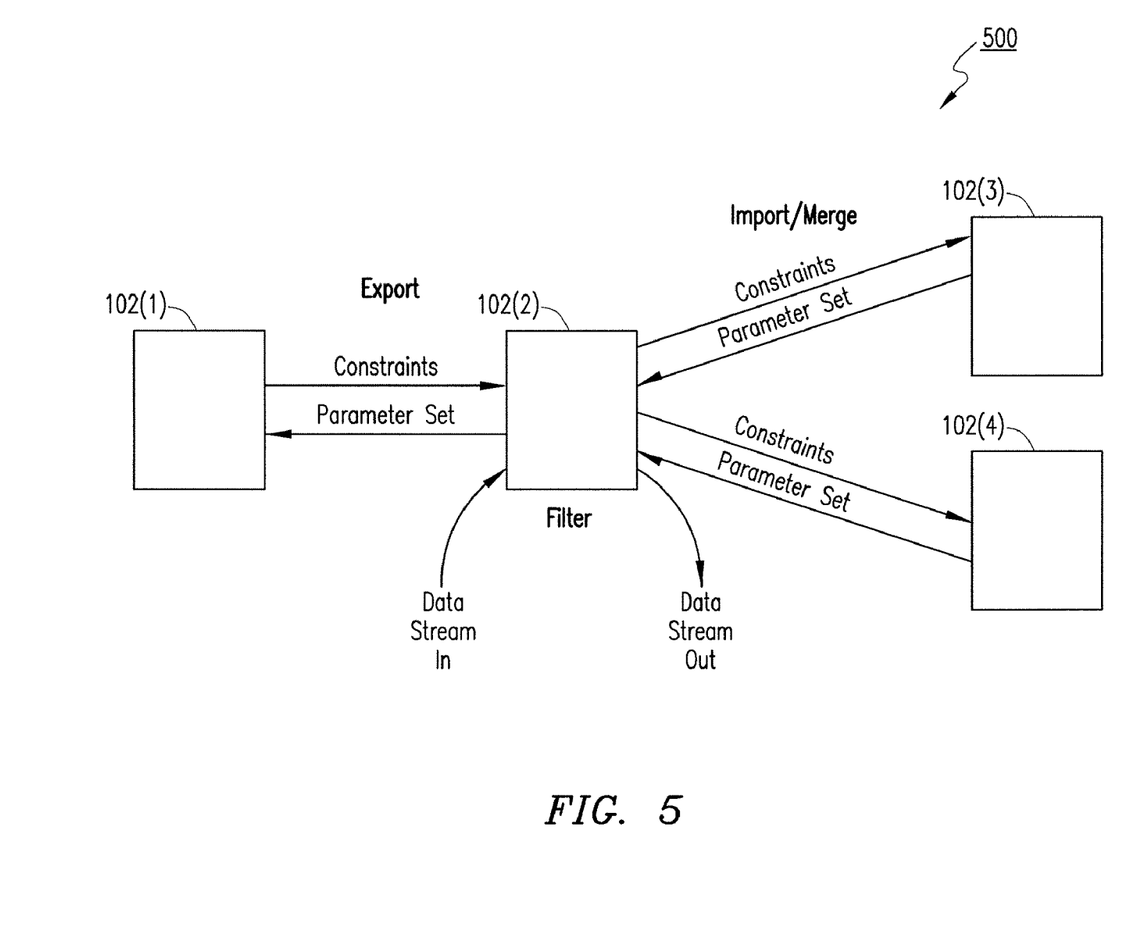
FIG. 5 illustrates a distributed system for sharing parameters among a plurality of data stream analyzers interconnected over a network.
Figure 8:
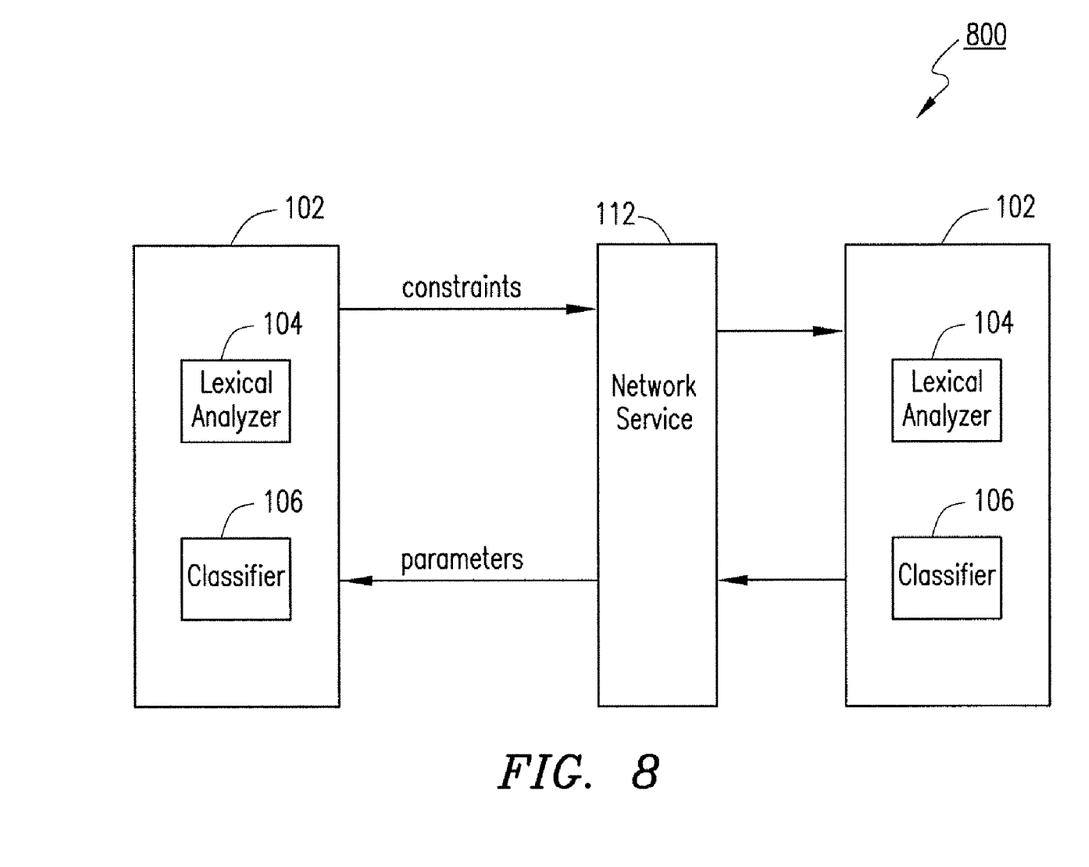
FIG. 8 illustrates interaction between a network services component and two data stream analyzers.

FIG. 5 illustrates a distributed system 500 for sharing parameters among a plurality of data stream analyzers 114 interconnected over a network. FIG. 5 represents an abstraction from a perspective of the data stream analyzers 114 and therefore omits other components such as network services components 112. As illustrated in FIG. 8 below, in various embodiments, the network services component 112 serves as an interface to the requesting data stream analyzer 102. In still other embodiments, as discussed above, the network services component 112 is involved in all network service requests.

Still referring to FIG. 5, a first data stream analyzer 102(1) initiates sharing of parameters by sending a remote request for parameters to a second data stream analyzer 102(2). A remote request may be constrained or unconstrained. If the remote request is unconstrained, the second data stream analyzer 102(2) responds with a reproduction of its own set of parameters. If the remote request is constrained, the remote request for parameters includes a set of constraints and the second data stream analyzer 102(2) sends its parameters in compliance with the constraints. For example, as a result of memory limitations of an implementing device, the first data stream analyzer 102(1) may request parameters for a category of interest with a constraint, for example, of 1000 states. In such a case, the parameters supplied by the second data stream analyzer 102(2) would only include 1000 states of its lexical analyzer. The second data stream analyzer 102(2) may supply only the most significant states, where significance is determined by higher token ratings within the category of interest.

Figure 6:
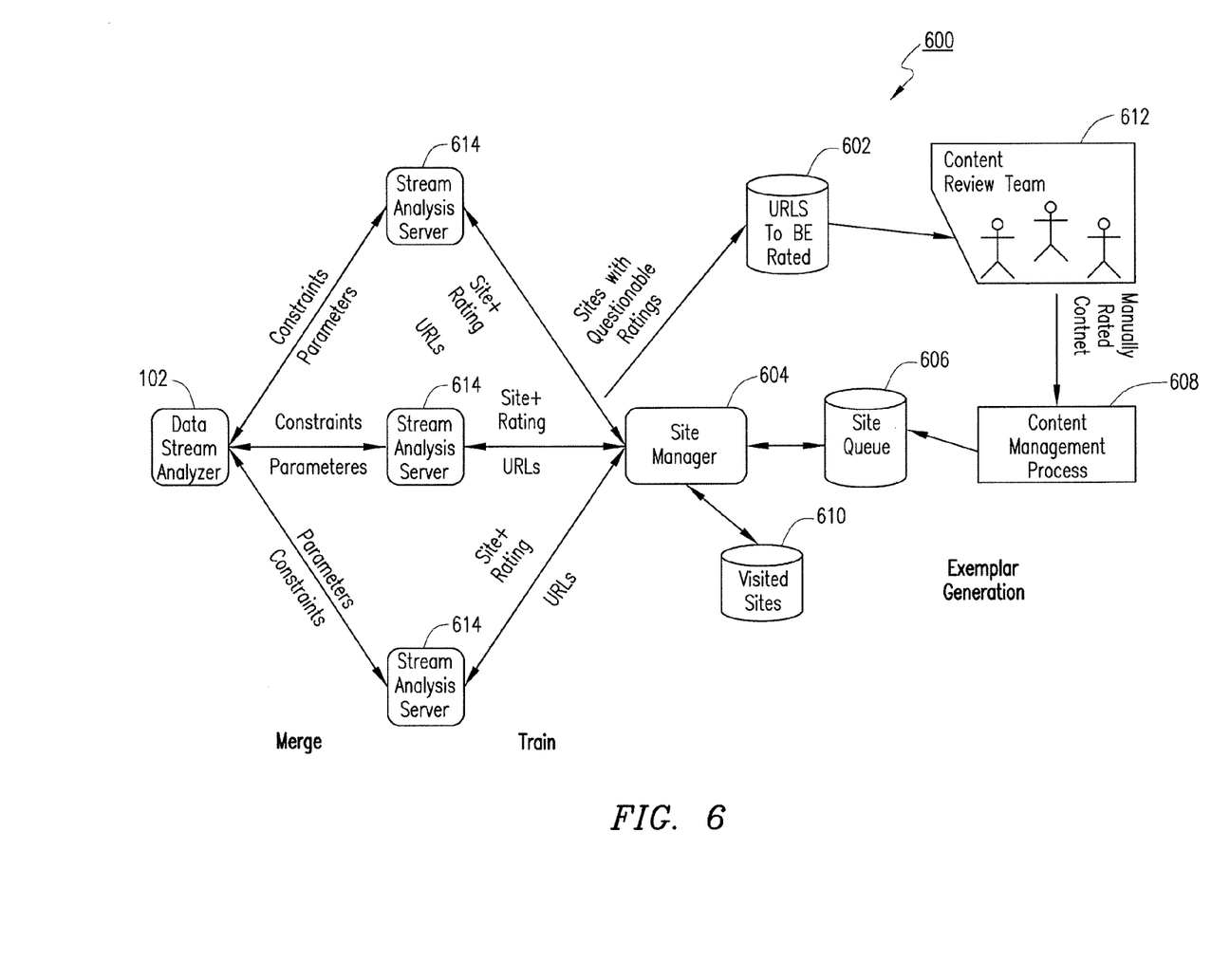
FIG. 6 illustrates a distributed system involving data stream analyzers, stream analysis servers, and a site manager interconnected over a network.

FIG. 6 illustrates a distributed system 600 including data stream analyzers 102, stream analysis servers 614, and a site manager 604 interconnected over a network. In a manner similar to that described with respect to FIG. 5, the data stream analyzer 102 may also remotely request parameters from the stream analysis servers 614. The stream analysis servers 614 are configured similarly to the digital-content-analysis system 100. In various embodiments, a site manager 604 includes software residing on a server that operates to crawl the Internet with an objective of classifying websites.

Upon receiving a processing request from one of the stream analysis servers 614, the site manager 604 sends a first URL and a classification to the requesting stream analysis server 614. For example, the site manager 604 may send "http://www.playboy.com" with a classification of PORN. The stream analysis server 614 then trains its classifier with a supervised training process, such as that as described with respect to FIG. 4. In the process of training, however, the stream analysis server 614 retrieves the website identified by the site manager 604 and collects all URLs in the identified website.

Figure 9:
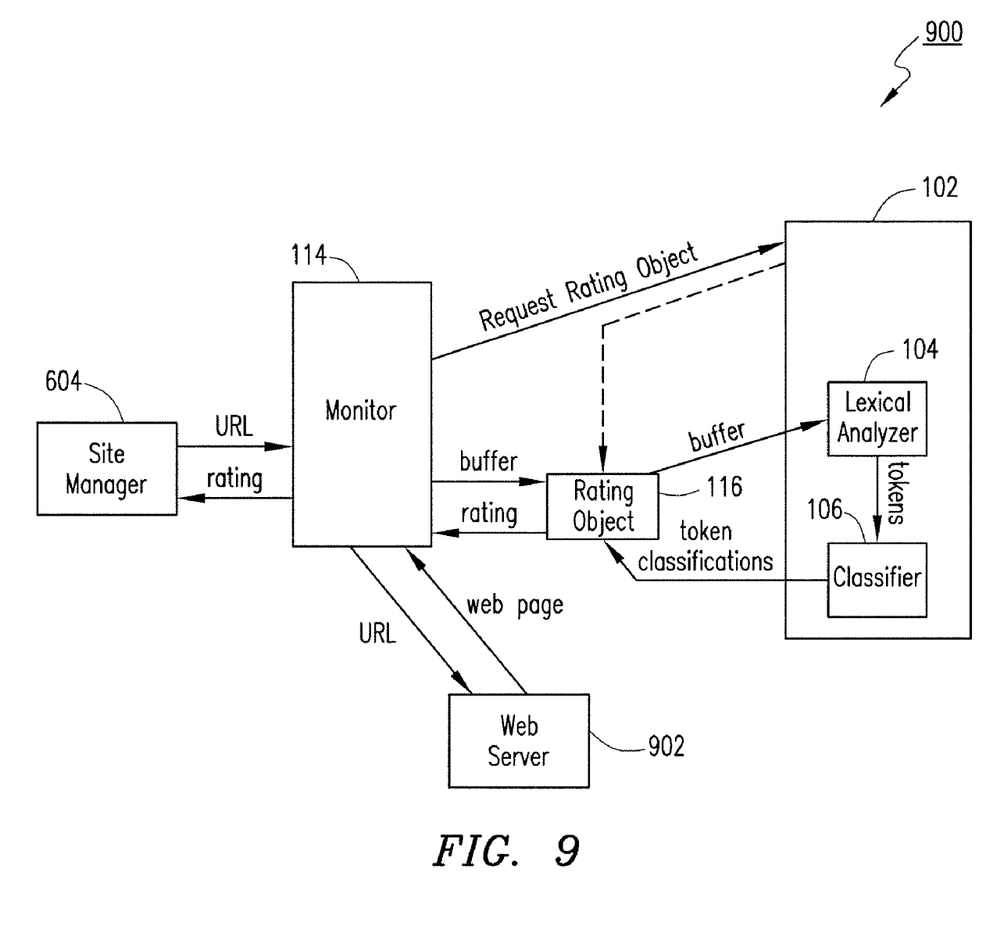
FIG. 9 illustrates an analysis and classification process in detail.

After completing training, the requesting stream analysis server 614 accesses websites identified by the collected URLs and analyzes and classifies the websites, for example, in the manner described with respect to FIGS. 1-5. FIG. 9 illustrates this process in further detail. In FIG. 9, a classification process similar to, for example, FIG. 3, is illustrated in which the site manager 604 provides websites for analysis and classification.

If a rating for a particular website is below a predetermined threshold for the category, in this example PORN, the website is added to a URL list 602 to be manually rated by a content review team 612 utilizing a content management process 608. Otherwise, the URLs are added to a site queue 606 maintained by the site manager 604 with the same classification as the first URL. Websites visited by the requesting stream analysis server 614 are added to a visited-site list 610.

Figure 7:
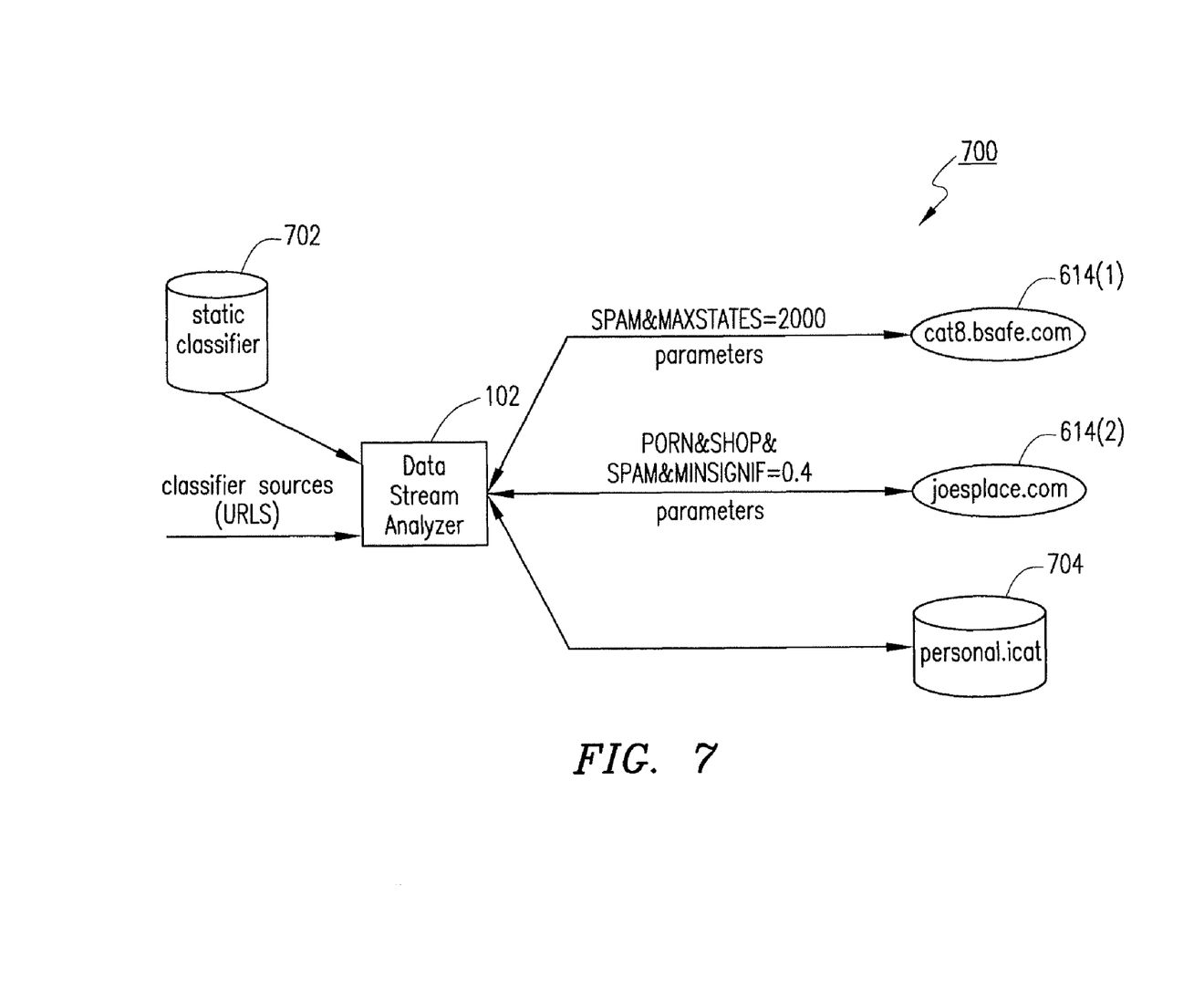
FIG. 7 illustrates sources and development of parameters.

FIG. 7 illustrates sources and development of parameters. In a system 700, the data stream analyzer 102 requests parameters from two stream analysis servers 614(1) and 614(2). As shown, the data stream analyzer 102 requests parameters from the stream analysis server 614(1), denoted "cat8.bsafe.com," for a category SPAM with a constraint of 2000 states. The data stream analyzer 102 also requests parameters from the stream analysis server 614(2), denoted "joesplace.com," for the categories PORN and SHOP with the constraint that the parameters have a minimum significance, or rating, of 0.4. The data stream analyzer 102 receives parameters in compliance with the constraints from each of the stream analysis servers 614(1) and 614(2). However, the data stream analyzer 102 also has access to parameters via the static storage areas 120 and 122 and the dynamic storage areas 108 and 110. The static storage areas 120 and 122, which provide default parameters, are shown collectively in FIG. 7 as a static classifier 702. The dynamic storage areas 108 and 110, which contain updated and refined parameters, are shown collectively in FIG. 7 as a complete parameter set 704. The parameters from the static classifier 702 and the stream analysis servers 614(1) and 614(2) are merged into existing parameters in the complete parameter set 704. As a result, parameters for the data stream analyzer 102 may be accessed from a single source, namely, the complete parameter set 704.

It is thus believed that the operation and system of various embodiments of the present invention will be apparent from the foregoing description. It will be obvious that various changes and modifications may be made to the methods and systems described herein without departing from the spirit and scope of the invention. For example, although the present invention has been described with respect to embodiments utilizing a filter for spam or objectionable or offensive content such as pornographic material, it will be understood to one skilled in the art that numerous other applications are within the scope of the invention. For instance, it is contemplated that program executables may be filtered for viruses using the systems disclosed herein. By classifying a program executable as a virus, a virus filter may filter a program executable and provide protection against viruses. Instead, it is contemplated that the present invention will only be limited and defined by the following claims.

What is claimed is:

1. A digital-content-analysis system comprising:
a network services component adapted to receive a remote service request;
a stream monitor adapted to form digital content into at least one data stream;
a stream analyzer interoperably coupled to the network services component and the stream monitor and adapted to receive and analyze the at least one data stream responsive to the remote service request, the stream analyzer comprising:
a lexical analyzer adapted to separate the at least one data stream into a plurality of tokens;
a classifier adapted to classify the at least one data stream into at least one category by processing at least a subset of the plurality of tokens and computing a classification rating for at least one category; and
a set of parameters, at least a subset of the parameters containing information developed from previous operation of the stream analyzer;
wherein the remote service request comprises a request for at least a subset of the set of parameters;
wherein the request for at least a subset of parameters includes at least one constraint based on a resource limitation of a source of the request; and
wherein the network services component, the stream monitor, and the stream analyzer are resident on a device comprising a processor and memory.

2. The digital-content-analysis system of claim 1, wherein the set of parameters comprises at least one selected from the group consisting of: categories, token lists, a dictionary of key words, and accumulated token ratings for at least one category.

3. The digital-content-analysis system of claim 2, wherein the lexical analyzer utilizes a finite state machine.

4. The digital-content-analysis system of claim 3, wherein the at least one constraint is a limit on a number of states of the lexical analyzer.

5. The digital-content-analysis system of claim 1, wherein the remote service request is a request for classification of digital content into at least one category.

6. The digital-content-analysis system of claim 1, wherein the system is adapted to process multiple service requests in parallel.

7. The digital-content-analysis system of claim 1, further comprising a digital content filter.

8. The digital-content-analysis system of claim 1, wherein the classifier is adapted to classify based on form and content of the digital content.

9. A system for providing distributed analysis and classification of digital content over a network, the system comprising:
a plurality of devices interconnected over the network and each comprising a processor and memory, at least one of the plurality of devices being a stream analysis server, each of the plurality of devices comprising:
a network services component adapted to send a remote service request to another digital content analysis system or receive a remote service request from another digital content analysis system;
a stream monitor adapted to form digital content into at least one data stream;
a stream analyzer adapted to receive and analyze the at least one data stream, the stream analyzer comprising:
a lexical analyzer adapted to separate the at least one data stream into a plurality of tokens;
a classifier adapted to classify the at least one data stream into the at least one category by processing at least a subset of the plurality of tokens and computing a classification rating for at least one category;
a set of parameters, at least a subset of the parameters containing information developed from previous operation of the stream analyzer;
a site manager adapted to request classification from the stream analysis server of digital content discovered while crawling the network; and
wherein the remote service request comprises a request for at least a subset of the set of parameters; and
wherein the request for at least a subset of parameters includes at least one constraint based on a resource limitation of a source of the request.

10. The system of claim 9, wherein the set of parameters comprises at least one selected from the group consisting of: categories, token lists, a dictionary of key words, and accumulated token ratings for at least one category.

11. The system of claim 10, wherein the lexical analyzer utilizes a finite state machine.

12. The system of claim 11, wherein the at least one constraint is a limit on a number of states of the lexical analyzer.

13. The system of claim 9, wherein the service request is a request for classification of digital content into at least one category.

14. The system of claim 9, wherein the system is adapted to process multiple service requests in parallel.

15. The system of claim 9, further comprising a digital content filter.

16. The system of claim 9, wherein the classifier is adapted to classify based on form and content of the digital content.

17. A digital-content-analysis method comprising:
   receiving a remote service request;
   forming digital content into at least one data stream;
   receiving the at least one data stream;
   analyzing the received at least one data stream, the step of analyzing comprising:
      separating the at least one data stream into a plurality of tokens; and
      classifying the at least one data stream into at least one category by processing at least a subset of the plurality of tokens and computing a classification rating for at least one category;
   wherein the analyzing step comprises using a set of parameters, at least a subset of the set of parameters containing information developed from previous analyzing steps;
   wherein the remote service request comprises a request for at least a subset of the set of parameters;
   wherein the request for at least a subset of the parameters comprises at least one constraint based on a resource limitation of a source of the request
   wherein the network services component, the stream monitor, and the stream analyzer are resident on a device comprising a processor and memory.

18. The digital-content-analysis method of claim 17, wherein the set of parameters comprises at least one selected from the group consisting of: categories, token lists, a dictionary of key words, and accumulated token ratings for at least one category.

19. The digital-content-analysis method of claim 18, wherein the analyzing step comprises utilizing a finite state machine.

20. The digital-content-analysis method of claim 19, wherein the at least one constraint is a limit on a number of states.

21. The digital-content-analysis method of claim 17, wherein the remote service request is a request for classification of digital content into at least one category.

* * * * *